US005791599A

United States Patent [19]
Blackburn et al.

[11] Patent Number: 5,791,599
[45] Date of Patent: Aug. 11, 1998

[54] SYSTEM FOR INCREASING THE AERODYNAMIC AND HYDRODYNAMIC EFFICIENCY OF A VEHICLE IN MOTION

[76] Inventors: Ronald F. Blackburn, 600 W. Country Lane Rd., Apt. #29-003, Highland Ranch, Colo. 80126; Barry M. Warmkessel, 767 Chopin Dr., Sunnyvale, Calif. 94087

[21] Appl. No.: 504,056

[22] Filed: Jul. 18, 1995

[51] Int. Cl.⁶ ............................................. B64C 1/38
[52] U.S. Cl. ............................................. 244/130; 219/746
[58] Field of Search ................................. 244/130, 134 R, 244/134 D, 204, 205, 1 N; 60/39.07; 219/746, 748; 250/493.1, 503.1, 504 R; 343/705

[56] References Cited

U.S. PATENT DOCUMENTS

| | | |
|---|---|---|
| 3,446,464 | 5/1969 | Donald ................................. 244/205 |
| 4,060,212 | 11/1977 | Magenheim . |
| 4,137,442 | 1/1979 | Tateda . |
| 4,246,583 | 1/1981 | Profera et al. . |
| 4,250,508 | 2/1981 | Dragone . |
| 4,365,131 | 12/1982 | Hansman ........................... 244/134 D |
| 5,061,836 | 10/1991 | Martin ............................... 244/134 D |

Primary Examiner—Andres Kashnikow
Assistant Examiner—Tien Dinh
Attorney, Agent, or Firm—Chris Papageorge

[57] ABSTRACT

The system includes radiation generation and transmission components which radiate tuned microwave electromagnetic energy outwardly from a vehicle through an antenna into a fluid medium through which the vehicle is moving. The microwave radiation is at the frequency of harmonic resonance electromagnetic excitation of the molecules of the medium which produces efficient heating of the fluid resulting in a reduction of the mass density thereof. This reduction decreases the drag forces acting on the vehicle resulting in a greatly enhanced aerodynamic and/or hydrodynamic efficiency and also decreases the intensity of the shock waves (which often lead to sonic booms). An aircraft's dramatically higher speed in the surrounding rarefied medium can make it appear to be travelling at "supersonic" speeds.

19 Claims, 10 Drawing Sheets

SYSTEM FOR INCREASING THE AERODYNAMIC AND HYDRODYNAMIC EFFICIENCY OF A VEHICLE IN MOTION

BACKGROUND OF THE INVENTION

The invention relates generally to systems for facilitating the motion of a vehicle through a fluid medium and, more particularly, to systems for facilitating the motion of aircraft through the atmosphere in order to significantly reduce the amount of energy required to propel the aircraft, significantly increase the maximum speed of the aircraft and substantially reduce the intensity and incidence of shock waves associated with the motion.

The well known sonic boom is a significant problem presented by aircraft capable of flying at supersonic speeds. The sonic boom is so annoying and so often damaging to homes, buildings and other property that military aircraft have been required to attain supersonic speeds over large bodies of water or sparsely populated areas in order to minimize these undesired effects. With the increasing prevalence and viability of commercial supersonic flight resulting from government research and development efforts and the increasing viability of commercial aircraft designed for speeds well in excess of supersonic speeds, the sonic boom effects have become more problematic.

The sonic waves generated by supersonic flight are also detrimental to the practicality of such supersonic flight because they result in an aerodynamic drag effect which retards the velocity of the aircraft thereby requiring more energy to propel it. For this reason and because frictional forces resisting movement of an aircraft increase with the square of the aircraft's velocity, high velocity aircraft as well as other types of high velocity vehicles typically require higher fuel expenditures and concomitantly produce higher levels of pollution as well as high consumption of fuel often made from nonrenewable natural resources. This high pollution and high fuel consumption is a serious economic and environmental problem that has been addressed by designing engines that have higher fuel efficiencies and lower pollutant emissions. These design efforts have successfully produced engines that are very efficient. Unfortunately, the proliferation of motorized vehicles of many sorts has nevertheless resulted in an increase in global pollution and higher energy consumption. In addition, the pollution reduction and energy efficiency augmentation systems for conventional engines have become so effective that further improvements on systems used on conventional engines is not likely to produce substantial improvements. Consequently, many engineers have sought to reduce pollution and increase energy efficiency of conventional vehicles by seeking to make modifications in other areas.

Ships and submarines are notoriously slow moving. Increases in the speeds of surface ships are prohibitively expensive, and this is the reason most commercial shipping operates at around twenty knots. Submarines, lacking the bow wave common to surface ships can travel faster, but substantial power sources are needed for a modest advantage over the speeds of surface ships. What's worse, there is tremendous acoustical vibration associated with these high speeds, which causes the submarine to lose its stealthy advantage normally afforded by the ocean's depths. Torpedoes can move faster than submarines, but again there are tremendous consumptions of the limited non-nuclear fuels available along with the accompanying warning from its acoustical signature that the weapon has been fired.

Many have sought solutions to the aerodynamic applications of these problems by developing systems which reduce the mass density of the medium through which a vehicle is moving and thereby reduce the drag forces acting on the vehicle while it is in motion. Some of these systems have specifically sought to reduce the mass density of the atmosphere through which aircraft are traveling and thereby reduce aerodynamic drag acting on the aircraft. This desired goal would not only provide increased fuel efficiency but also enable the aircraft to achieve higher maximum attainable speeds. As an additional benefit, the intensity and incidence of shock waves associated with the aircraft would be reduced resulting in elimination of or reduction of the intensity of a sonic boom otherwise produced when the aircraft attains supersonic speeds.

Some prior art methods and devices for reducing the mass density of the atmosphere through which an aircraft is flying have utilized incendiary compounds to heat the air and thereby reduce the mass density thereof. Two examples of such methods are disclosed in U.S. Pat. Nos. 4,917,335 to Tidman and 3,620,484 to Schoppe. The Tidman method essentially generates and maintains combustion of a flammable compound which is ejected from the aircraft directly into the atmosphere immediately in front of the aircraft. The Schoppe method utilizes a mechanical flame thrower to also produce combustion directly in front of the aircraft but additionally uses a blunt nosed body to compress the air prior to the combustion for enhanced efficiency thereof. Thus, in both these methods, the aircraft consequently travels through a fireball of reduced mass density which reduces aerodynamic drag and the incidence and severity of sonic boom. However, a primary disadvantage of such a method is that the chemical reaction as well as the ejection of the combustible mass may not be fast enough to rarefy the atmosphere in front of an aircraft traveling at supersonic speeds. In addition, the required speed of combustion may result in generally incomplete combustion and thereby wasting of fuel and production of inordinate amounts of pollutants. The requirement of a blunt body precludes the system from being used to reduce the density of the atmosphere in front of the entire aircraft or, more specifically, in front of wing leading edges as well as other portions thereof.

Other prior art systems designed to reduce aerodynamic drag and sonic waves rarefy the atmosphere in front of the aircraft by moving air molecules rearwardly from the leading edges of the aircraft. An example of such a system is disclosed in U.S. Pat. No. 3,446,464 to Donald. The Donald apparatus utilizes electrodes placed both at the leading edges and rearward of the leading edges. Different electrical potentials applied to the electrodes produce an electrical field which moves the air molecules rearwardly from the leading edges thereby reducing the buildup of air pressure in front of the leading edges. However, a primary shortcoming of the Donald apparatus is that it does not directly move air molecules which are in front of the leading edges and thus is of limited effectiveness in reducing aerodynamic drag and sonic boom.

Since the 1940's some designers of aircraft have sought to reduce aerodynamic drag by radioactive excitation of the air molecules proximal to or adjacent to the aircraft. Early designs have utilized radioactive coatings on the skins of the aircraft to ionize the air molecules at the boundary layer at the aircraft fluid-solid interface thereby inducing repelling or attractive forces on these ions and/or to induce a vibrational or rotational excited state in the air molecules thereby altering their viscosity. A technologically improved design utilizing such a concept is disclosed in U.S. Pat. No. 3,510,094 to Clark in which the magnitude and number of alpha and beta particle emissions from the radioactive layer on the aircraft skin is controlled. However, a primary disadvantage of these types of designs is that they do not have a high degree of energy efficiency in reducing the density of the air in front of the aircraft where it is most needed because the emissions radiate outwardly in all directions. Moreover, the radioactive emissions can interfere with aircraft computer, radio and radar systems as well as being potentially dangerous to personnel within the aircraft or in the vicinity of the aircraft.

Still other prior art systems utilize laser beam radiation to heat the air passing through the beam and thereby rarify the air through which the aircraft is moving. An example of such a system is disclosed in U.S. Pat. No. 5,263,661 to Riley. The Riley device uses a laser radiating a beam along the leading edge of an aircraft wing to the tip. The air passing through the beam as the aircraft flies through the atmosphere is heated and rarified thereby compressing more slowly as a result of the aircraft's motion than it normally would and creating a lower mass density thereof which is less favorable to development of a sonic boom. However, a primary disadvantage of such a system is that it has a high power requirement because laser radiation does not efficiently produce a high degree of heat energy in the air molecules.

Consequently, what is needed is a system for reducing the mass density of the air in the path of flight of the aircraft as well as adjacent to aircraft skin surfaces in order to maximize reduction of the forces of friction and other drag forces acting on the aircraft during flight. What is also needed is a system for reducing the mass density of the air proximal the aircraft which is able to provide such reduction of mass density very quickly and with a relatively high degree of energy efficiency.

SUMMARY OF THE INVENTION

It is a principal object of the present invention to provide a system for reducing the mass density of the fluid medium in front of a vehicle moving through the medium in order to reduce drag forces and sonic waves produced by the motion.

It is also an object of the present invention to provide a system for reducing the mass density of the fluid medium adjacent to and proximal to lateral and rearward portions of a vehicle moving through a fluid medium in order to reduce drag forces and sonic waves produced by the motion.

It is also an object of the present invention to provide a system for reducing the mass density of the fluid medium through which a vehicle is moving which achieves the mass density reduction quickly and effectively.

It is also an object of the present invention to provide a system for reducing the mass density of the fluid medium through which a vehicle is moving which is relatively safe.

It is also an object of the present invention to provide a system for reducing the mass density of the fluid medium through which a vehicle is moving which is energy efficient.

It is also an object of the present invention to provide a system for reducing the mass density of the fluid medium through which a vehicle is moving which entails minimal interference with vehicle electronic components.

It is also another an object of the present invention to provide a system for reducing the mass density of the fluid medium through which a vehicle is moving which is effective at both subsonic and supersonic speeds.

It is an object of the present invention to provide a system for reducing the mass density of the fluid medium through which a vehicle is moving which provides heat energy transfer with vehicle engine systems for enhanced energy and power efficiency.

It is an object of the present invention to provide a system for reducing the mass density of the fluid medium through which a vehicle is moving which provides a high degree of efficiency in producing a high degree of mass density reduction of the fluid medium.

Basically, the aerodynamic and hydrodynamic efficiency augmentation system of the present invention achieves its goal of reducing the mass density of the fluid medium through which a vehicle is moving by heating the fluid medium proximal to the vehicle to a high temperature. The heating is accomplished via radiation of tuned electromagnetic power outwardly from the vehicle into the fluid medium. The electromagnetic radiation is within the microwave range in order to maximize transfer of electromagnetic energy received by the fluid medium molecules into heat energy. In addition, the frequency of the electromagnetic radiation is at the harmonic resonance frequency of electromagnetic excitation of the particular type of molecules of which the medium is composed. Radiation at the harmonic resonance frequency maximizes the power transfer efficiency of the heating of the fluid medium provided by the system of the invention.

The system of the present invention is particularly well suited for both subsonic and supersonic aircraft for which the effects of aerodynamic drag and sonic wave production are more pronounced. The system of the invention is also very suitable for Force Projection Vehicles type aircraft which utilize wing-in-ground effect airfoils generating almost double the normal lift capability because of a combination of ground effect and downwardly projecting airfoils (at the wing tips) that confine inrushing air. Force Projection Vehicles normally cruise twenty feet above the sea over which it is most efficient but can also fly above land although at a higher altitude. Their low altitude capability renders them very advantageous in military operations because of their relative invisibility to radar. However, Force Projection Vehicles, although also advantageous because effective and efficient in transport of large and heavy cargo, are currently limited to flight at relatively slow speeds. By substantially increasing maximum speed capability, the aerodynamic efficiency augmentation system can overcome this important shortcoming of Force Projection Vehicles. In addition, the system of the invention is also well suited for transatmospheric vehicles of many types. For these and similar types of applications in which the vehicle is moving through the atmosphere, the frequency of the electromagnetic radiation is preferably at the harmonic resonance frequency of electromagnetic excitation i.e., electromagnetic absorption peak, of oxygen. Oxygen (as well as water) has a substantial electric and magnetic dipole which can easily be excited by tuned microwave radiation. When heated, the oxygen molecules quickly transfer their heat energy to adjacent nitrogen and other component molecules of the medium resulting in quick and thorough heating of that portion of the atmosphere in the immediate path of the aircraft enabling the aircraft to fly in a thinner atmosphere resulting in reduced aerodynamic drag. Heating of the air decreases the pressure gradient at the front (and preferably also the rear) of the aircraft thereby destroying the coherency of the pressure fronts so that they do not add together coherently. This reduces the pressure gradients acting on the boundary layer between the ambient air and the aircraft because they are distributed over a larger region i.e., several meters rather than several centimeters. The system of the invention essentially produces a "hot air bubble" around the aircraft which reduces the expended power at true supersonic speeds because the coherent addition of pressure waves around the aircraft is degraded. This reduces or eliminates the energy transmitted to the shock cone i.e., the pressure field produced at supersonic speeds and located at the rear of the aircraft and extending therefrom in a widening cone, thereby preventing or reducing the build up of sonic waves and thus the reduction or elimination of a "sonic boom".

The system of the present invention can reduce the mass density of a fluid medium comprising either a liquid or gas and may even be utilized to reduce the mass density of a medium such as ice and thus increase the dynamic i.e., generally aerodynamic as well as hydrodynamic, efficiency of a vehicle moving through either air or water. Thus, the system may also be utilized for waterborne and underwater vehicles. For these types of vehicles the mass density of the water is reduced by irradiation at preferably the harmonic resonance frequency of electromagnetic excitation of water. As with aircraft, this enables the waterborne and underwater vehicles to move through the water with less inertial and/or viscous drag resisting their movement thereby allowing higher maximum speed and acceleration and reduced fuel consumption.

The torpedo seems to be the easiest application platform to which to apply this phenomena. It could speed toward its target through an atmosphere of steam, stabilizing itself by a pair of fore and aft fins hydroplaning through the surrounding water. A submarine could enjoy the same advantage for a short period of time, unless some of the onrushing water were piped aboard for cooling purposes. Surface ships, of the sizeable displacement of current ocean going naval and commercial marine variety could ride a bubble of steam, effectively hydro-planing over the ocean's surface. The "steam bubble" would be the vehicle which would transmit the multi thousand tons of weight to the ocean's surface, replacing the conventional displacement of water which provides the buoyant force for these vessels.

For transatmospheric (reentry) vehicle applications, the rarefaction of the atmosphere in the path of the vehicle also results in reduced frictional heating of the nose cone or other portions of the vehicle prone to overheating and provides increased protection to internal computer, electronic or other components sensitive to heat which may otherwise be damaged by or malfunction due to such heat generation.

For aircraft applications, the dynamic efficiency augmentation system incorporates microwave radiation generators mounted in the engines of the aircraft. The microwave generators exchange heat with the airflow entering and exiting the engine resulting in improved energy efficiency of both the engines and the generators. The induction airflow provides cooling for the generators while the exhaust airflow is provided with increased heating and thereby increased expansion of the engine exhaust gases resulting in improved thrust.

The output of the microwave generator is fed to an antenna which transmits the radiation through the interior of the aircraft and outwardly therefrom into the atmosphere in order to heat and thereby rarefy the air in the path of the aircraft as well as preferably rearwardly thereof. Thus, the microwave energy is radiated outwardly from preferably both the leading and trailing edges of the aircraft. In addition to transmission directly into the air, radiation transmission over portions of the skin of the aircraft produces heating and rarefaction of the air adjacent lateral surfaces of the aircraft which tends to cling to the aircraft skin and produce viscous drag. The net effect is the production of a hot bubble of rarefied air surrounding the aircraft while it is moving through the atmosphere reducing aerodynamic drag on the aircraft and sonic wave generation (which also adds to aerodynamic drag). As a result, this reduces the fuel expenditure required for the aircraft to reach a desired speed and its maximum attainable speed is also increased. In addition, it may attain supersonic speeds without generation of a sonic boom or with generation of a sonic boom of reduced intensity.

The calculations that follow provide a determination of the power needed as well as other parameters of the system components required to provide that power needed to heat the onrushing air from approximately zero degrees to 1800 degrees Centigrade for a typical fighter aircraft in flight where the wings of the aircraft are D meters wide and the aircraft velocity is v=1000 mph. In the calculations it is assumed that the column of onrushing air is +/−y meters on either side of the wings. The mass of the air encountered by the wings (whose cold air density is 1.29 kgrams/meter$^3$) which must be heated every second is:

$$2y \times D \times v \times 1.29 \times 273 \text{ degrees Kelvin}/2073 \text{ degrees Kelvin.}$$

For a fighter aircraft with wings 12 meters wide, the power needed to heat the air +/−one meter above and below the wing's edge is:

$$2 \times 1 \times 12 \times 514 \times 1.29 \times 0.1317 = 2096 \text{ kgram/seconds.}$$

The change in the specific heat of the air when its temperature is increased from 100 degrees Centigrade (0.2404 cal/gram) to 1800 degrees Centigrade (0.2850 cal/gram) is 0.0446 cal/gram, and this leads to the following:

$$4.18 \text{ joules/cal.} \times 0.0466 \text{ cal/gram} = 0.1864 \text{ Joules/gram} = 0.1864 \text{ kjoules/kgram.}$$

Thus, the power which must be transmitted into the air in front of the wings is:

$$0.1864 \text{ kjoules/kgram} \times 2096 \text{ kgram/sec} = 391 \text{ kjoules/sec} = 0.4 \text{ megawatt.}$$

To heat a column of air R meters in radius i.e., a size sufficient to permit the aircraft's fuselage and engine nacelles to pass therethrough, requires:

$$\pi \times R^2 \times v \times 1.29 \text{ (density of cold air)} \times 273 \text{ degrees Kelvin}/2073 \text{ degrees Kelvin.}$$

For an aircraft fuselage (and nacelles) 2 meters in radius requires:

$$\pi \times 4 \times 514 \times 1.29 \times 0.1317 = 1098 \text{ kgram/sec.}$$

Thus, the power which must be transmitted into the air is:

$$0.1864 \text{ kjoules/kgram} \times 1098 \text{ kgram/sec} = 205 \text{ kjoules/sec} = 0.2 \text{ megawatt.}$$

The total power required=0.4 megawatt+0.2 megawatt =0.6 megawatt.

Assuming that the air is heated by first ionizing the oxygen molecules to their first ionization state, then this energy is shared by mutual excitation (rotation) of the nitrogen molecules so that the nearby air molecules eventually rise to an average temperature of about 1800 degrees Centigrade. A triangular (in cross-section) beam +/−A° wide at the front edge or tip portion of the aircraft fuselage (and engine nacelle) and extending b meters from it must be formed to heat this column of air. It will be assumed that all the oxygen molecules in this region will be ionized every time the 60 GHz beam produced by the microwave generator fires, and the duty cycle of this transmission is 0.0012. The first ionization potential, $I_p$ is $4.8844 \times 10^4$ kjoule/kgram. It is believed that air exists in an ionized state out to at least b (6 meters). The instantaneous mass of oxygen excited by the 60 GHz radio frequency beam=1 and is provided by:

$I = \pi \times D \times \frac{1}{2} b \times (2 \times b \tan A) \times 0.2$ (air: 20% oxygen) $\times 1.29$ kgram/m$^3$ (cold air density)

$I = 3.1416 \times 30 \times 6$ m (assumed extent of ionization)$\times 6 \times \tan 1.24° \times 0.2 \times 1.29$ $I = 18.9519$ kgram.

The average ionization power expended $P_i$ is:

$P_i = I_p \times I \times$ transmission duty cycle $= 4.8844 \times 10^4$ kjoule/kgram $\times 18.95$ kgram$\times 0.0012$.

Thus, the ionization power expended is:

$P_i = 1.1$ megajoules per second=approximately 1 megawatt.

The half beam-width required to ionize a column of air meters (1 meter) in radius a distance b meters (6 meters) in front of the aircraft's fuselage is given by:

$A° = \tan^{-1}(r/b) = \tan^{-1}(\frac{1}{6}) \backslash 19°/2$.

The microwave beam is preferably radiated outwardly from the aircraft into the column of air by means of a forward refocusing cassagrain antenna. The size z of the aperture which is the focus of the secondary antenna of the forward refocusing cassagrain antenna (assuming 60 GHz power) to generate a beam 2×A° wide is:

$z = 65° \times 0.5$ cm. (wavelength for 60 GHz RF)$/(2 \times A°) = 65° \times 0.5$ cm./ (19°)

$z = 1.7$ cm.

The size d of the cassagrain primary needed to form a beam 2.5° wide is:

$d = 65° \times 0.5$ cm./$(A°) = 65° \times 0.5$ cm./$(2.5°) = 13$ cm.

DETAILED DESCRIPTION OF THE PREFERRED EMBODIMENT

Figure 1:
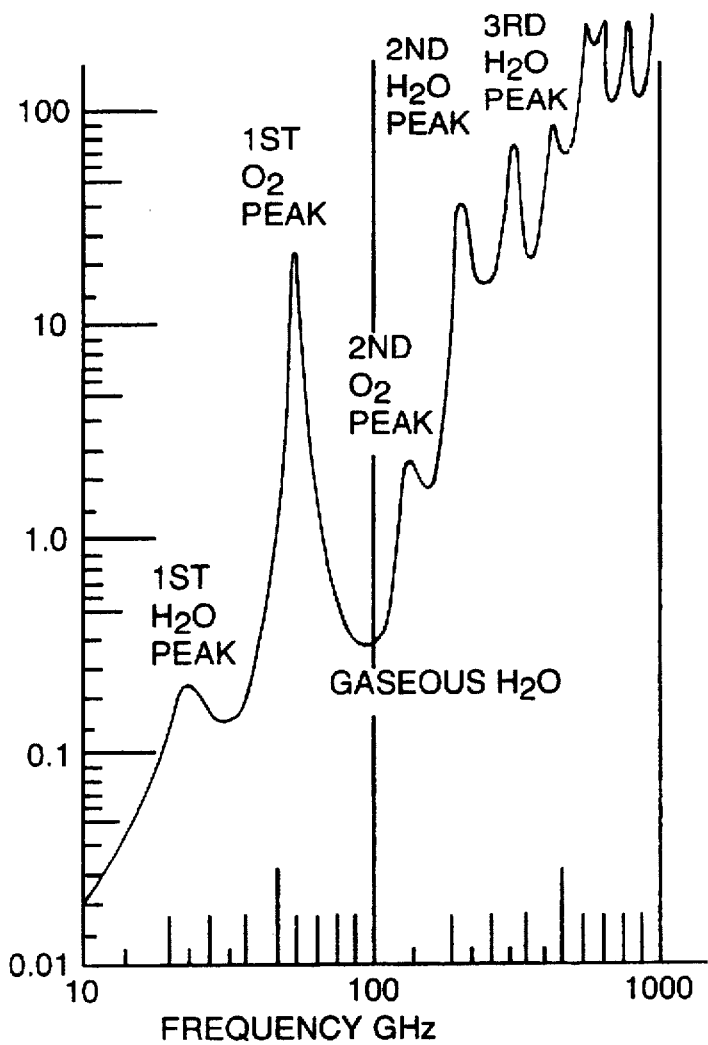
FIG. 1 is a graphical representation showing the atmospheric attenuation of microwave radiation by oxygen and water molecules thereof and illustrating their absorption peaks.

Basically, the aerodynamic efficiency system of the invention utilizes the microwave frequency selective absorption peaks of oxygen to provide effective and efficient heating of portions of the atmosphere in the path of a vehicle moving therethrough. Water and oxygen have electric and magnetic dipoles which enable them to more readily vibrate in response to microwave radiation. The microwave absorption peaks shown in FIG. 1 are the microwave frequencies at which harmonic resonance excitation of these types of molecules occur which maximizes heat produced in response thereto. As shown in FIG. 1, maximum attenuation of radiation occurs at the first oxygen peak of approximately sixty GHz and this is therefore the frequency deemed optimum for energy efficient heating of the atmosphere. However, nitrogen molecules do not have significant dipole properties and therefore cannot efficiently be heated by microwave radiation. Consequently, the nitrogen molecules in the atmosphere (as well as other types of molecules therein) are instead indirectly heated by direct physical transfer of heat energy from oxygen molecules which are proximal thereto thereby producing rapid heating of an entire desired portion of the atmosphere. As is also evident from FIG. 1, microwave radiation can also be used to heat a medium composed partly or entirely of water thereby allowing a vehicle to move with less friction through a "tunnel" or "channel" of rarefied water in the path of the vehicle.

Figure 2:
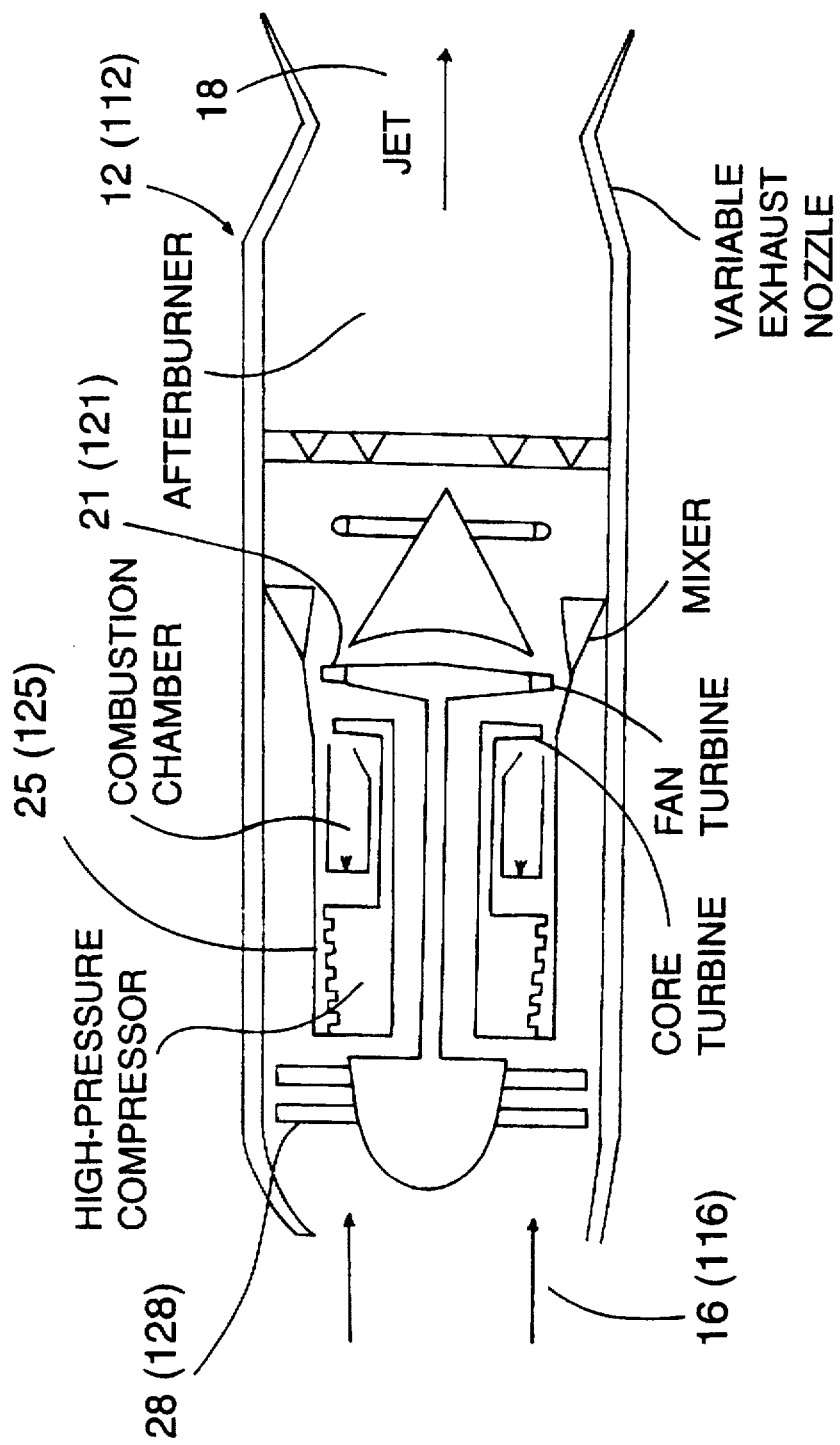
FIG. 2 is a plan view of a typical turbofan jet engine suitable for use with the aerodynamic efficiency augmentation system of the present invention.
Figure 3:
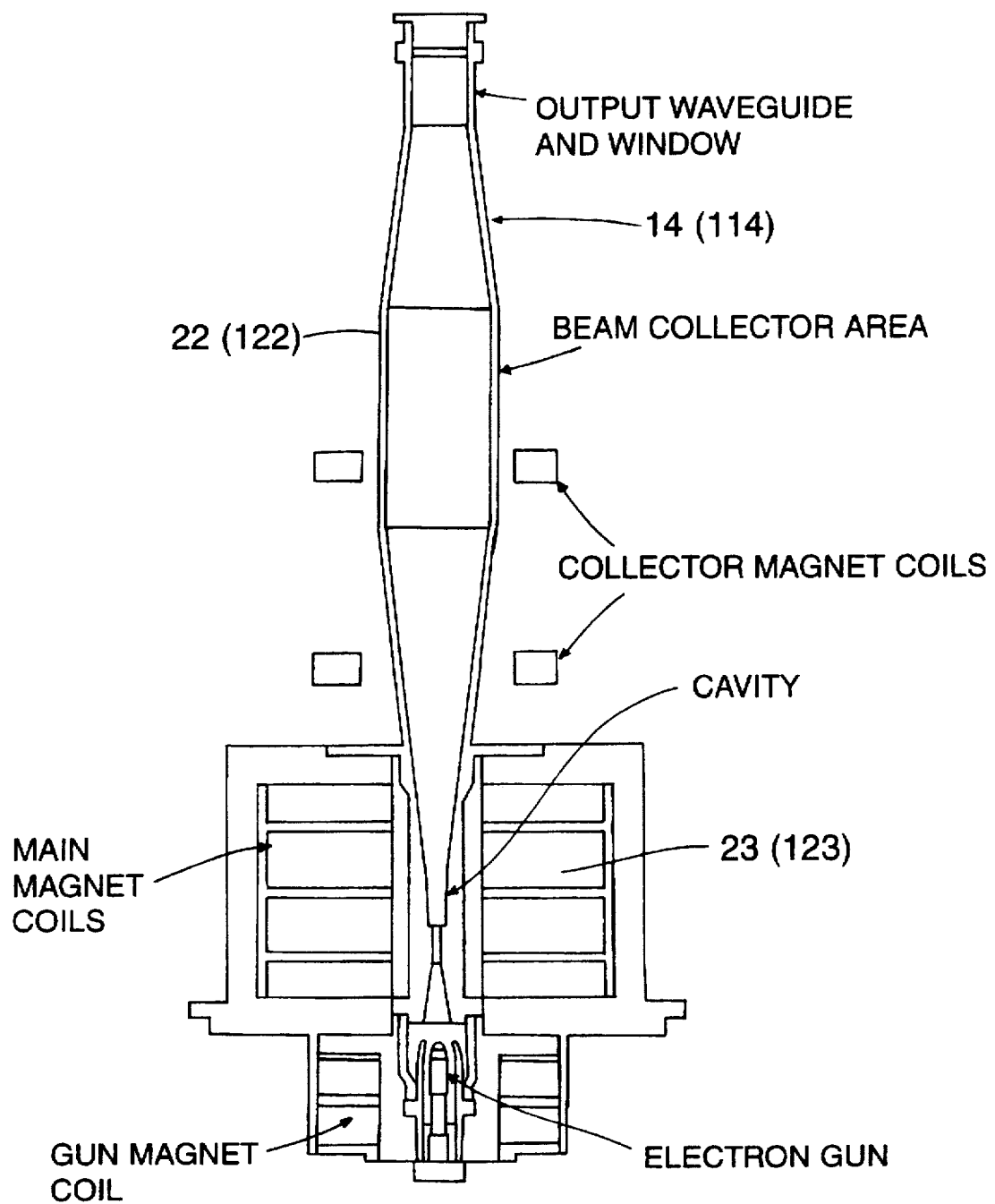
FIG. 3 is a plan view of a continuous wave gyrotron type of microwave radiation generator component of the aerodynamic efficiency system of the invention.
Figure 4:
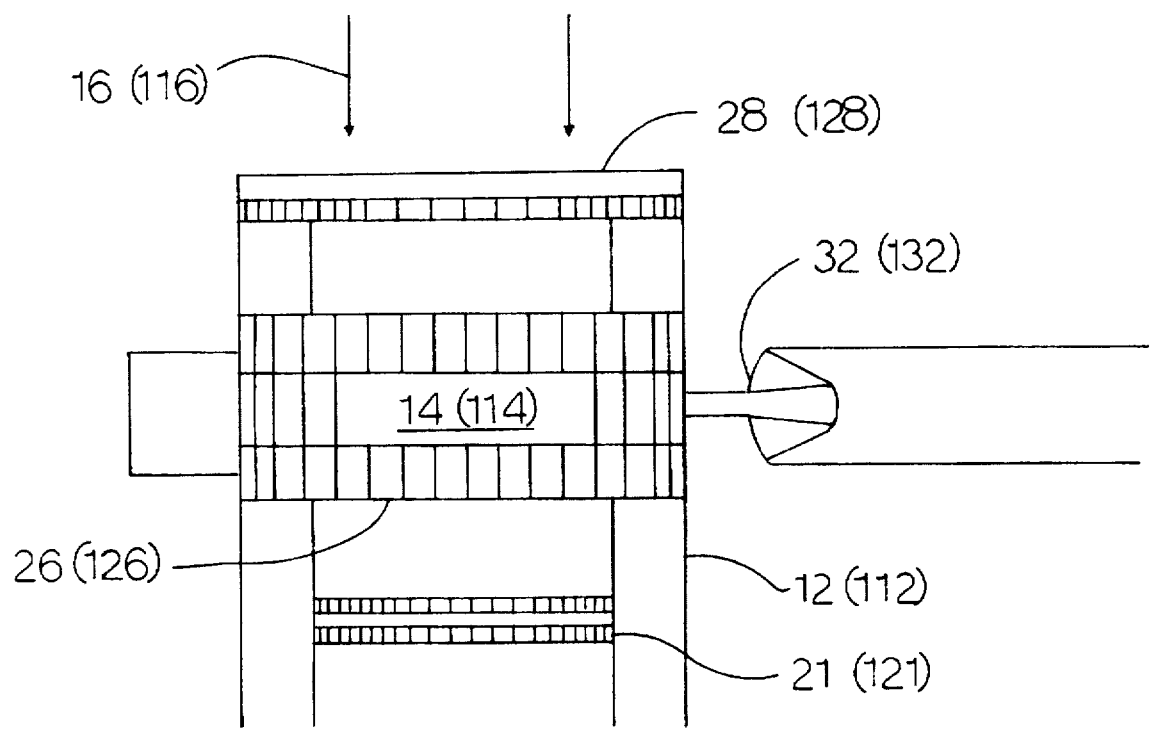
FIG. 4 is a plan view of the gyrotron mounted in an aircraft jet engine and positioned for heat exchange therebetween and also showing the antenna therefor.

Two preferred means of applying the concept of the present invention to a jet aircraft are described in a first embodiment and a second embodiment generally designated by the numerals 10 and 110, respectively. FIGS. 2, 3 and 4 depict components of the invention common to both embodiments and used in essentially the same way. FIG. 2 shows a typical jet engine 12 (112) which is suitable for use with the concept of the present invention, and FIG. 3 depicts a microwave electromagnetic radiation generator 14 (114) positioned in such an engine 12 (112) between the low pressure fan 28 (128) and the compressor turbine fans thereof 21 (121) for heat transfer between the induction and exhaust airflows 16 (116), 18 (118) and the generator 14 (114). The microwave generator 14 (114) is preferably a gyrotron tube 14 (114) although other suitable types of microwave generators may also be utilized. The gyrotron type 14 (114) is thus attached to the engine 12 (112) before the compressor 25 (125) and the compressor turbine fan 21 (121) and arranged so that it is in the path of the dense flow of air after the bypass fan 28 (128) of a low or high bypass jet engine 12 (112) but before the compressor of the engine 12 (112), as shown in FIG. 4 and with reference to FIG. 2. The gyrotron tube 14 (114) is also preferably oriented so that it is approximately transverse to the axis of the jet engine 12 (112), as shown in FIGS. 4, 6, 7, 10 and 11. The gyrotron tube 14 (114) has an electron collector 22 (122) and collection of the gyrotron's 14 (114) electron beam generates heat which is the major source of heat due to the relative high density and high velocity of the electron beam and super conducting magnets 23 (123) which must be kept cool to provide maximum power efficiency in maintaining magnetic field strength. The electron collector 22 (122) is conventional in structure and function and is preferably cooled with water (although liquid sodium may also be suitable) as with conventional gyrotron designs preferably via a conventional radiator subsystem suitably positioned in the path of the airflow 16 (116), while the super-conducting magnets are located at outermost portions of the engine 12 (112) and wings 24 (124) of the aircraft 20 (120) thereby obtaining the required cooling directly from the atmosphere. The electron gun of the gyrotron 14 (114) forms an electron beam which is accelerated through the focusing field of the magnets 23 (123) to the electron collector 22 (122). The electrons of the beam interact with radio-frequency electric fields perpendicular to the magnetic focusing field. The rotation of the electrons in the field and the alternation of the fields in synchronism therewith produce a cumulative interaction resulting in an oscillation. The interaction between the electrons and the fields causes the electrons to bunch in an elongate trajectories enabling extraction of energy from the electrons and by utilizing the resonance nature of the interaction producing the desired high frequency output. As shown in FIG. 3, the coolant vanes 26 (126) of the gyrotron tube 14 (114) are preferably mounted inside the engine 12 (112) for heat exchange with the induction airflow passing through the engine 12 (112). The vanes 26 (126) are preferably curved to conform with the laminar flow of the air generated by the bypass fans 28 (128) of the engine 12 (121), but they are depicted as straight for simplicity of illustration. The heat from the collector 22 (122) is transferred to the airflow 16 (116) passing into the low pressure fan 28 (128) used to generate compressed cold air which is mixed with the engine's gas turbine hot exhaust 18 (118). The temperature of the exhaust airflow 18 (118) is thereby increased providing increased engine thrust while the electron collector 22 (122) is cooled without necessitating the energy burden of a cooling subsystem specifically for cooling the collector. Thus, the efficiency of both the generator 14 (114) and the engine 12 (112) are improved. This heat exchange could be used in a high bypass jet engine as well as a low bypass turbofan jet engine the latter of which would be more effective because a two or three stage low pressure fan is used to generate compressed cold air (a high pressure compressor feeds the jet engine's fuel/air mixture).

Figure 5A:
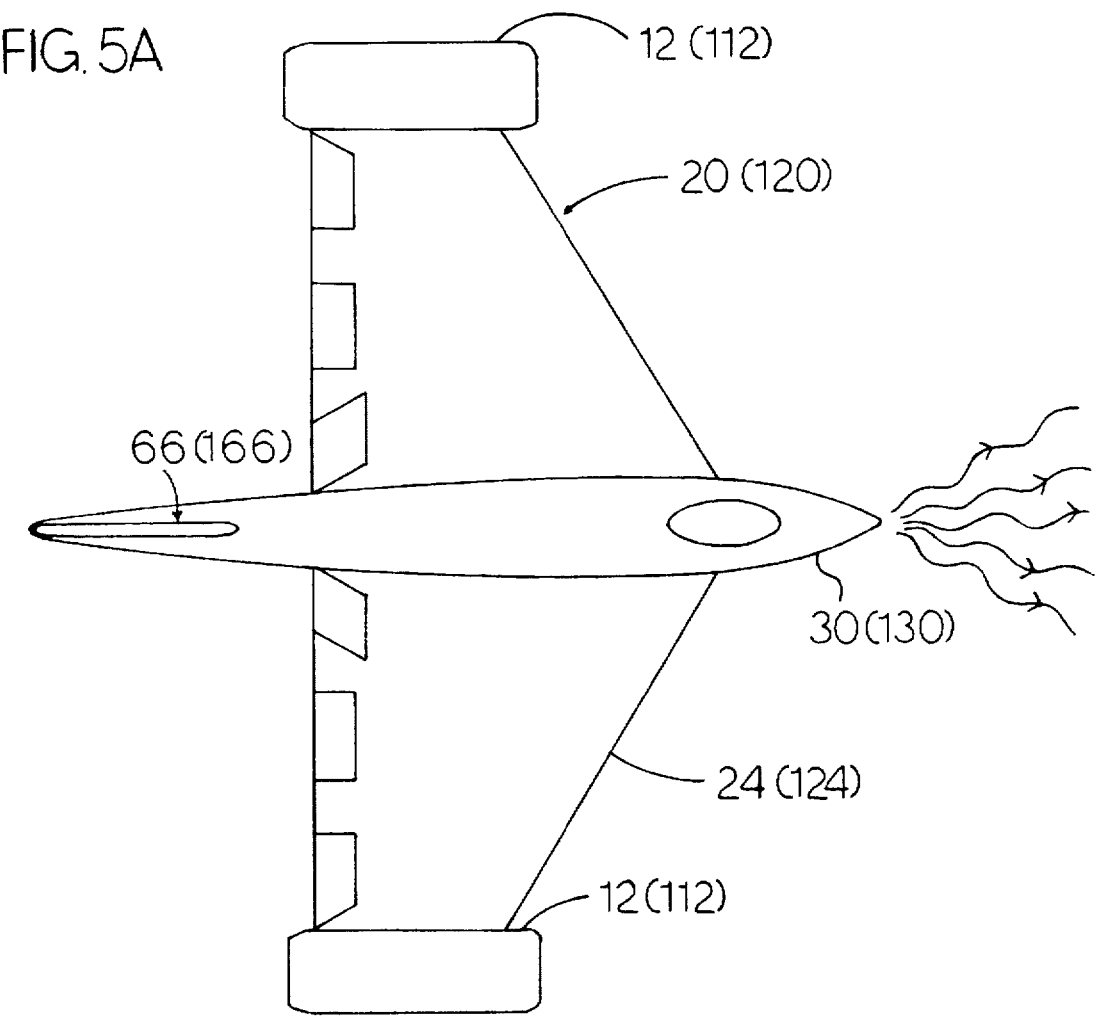
FIG. 5A is a top plan view of the aerodynamic efficiency augmentation system of the invention mounted in an aircraft and showing the microwave beams radiated into the atmosphere in front of the aircraft.
Figure 5B:
FIG. 5B is a side plan view of the aerodynamic efficiency augmentation system of the invention mounted in an aircraft and showing the microwave beams radiated into the atmosphere in front of the aircraft.

The first embodiment 10 of the invention is shown generally in FIG. 5 and more specifically in FIGS. 6, 7, 8 and 9. The first embodiment includes the generators 14 and the components thereof which are mounted in the engines 12 of the aircraft 20, as described generally above. The generators 14 preferably include a pair of continuous wave gyrotrons 15 and 17 and a pulse gyrotron 19 mounted in each of the engines 12. The pulse gyrotron 19 provides pulsed radiation which is emitted from preferably the front portion of the fuselage 30 of the aircraft 20 in order to allow radar and continuous wave (cw) communication subsystems to be used in the aircraft. High speed interruption of the low frequency audio rates employed on a single channel VHF or UHF (cw) radio transmitter is tolerable for such transmissions where the gyrotron 19 operates with a pulse repetition interval of four-hundred microseconds (2500 pulses per second) and would also permit a thirty mile weather or engagement radar subsystem to operate effectively. The gyrotron 19 preferably operates with a fifty percent duty factor, on for four-hundred microseconds and off for four-hundred microseconds.

Figure 7:
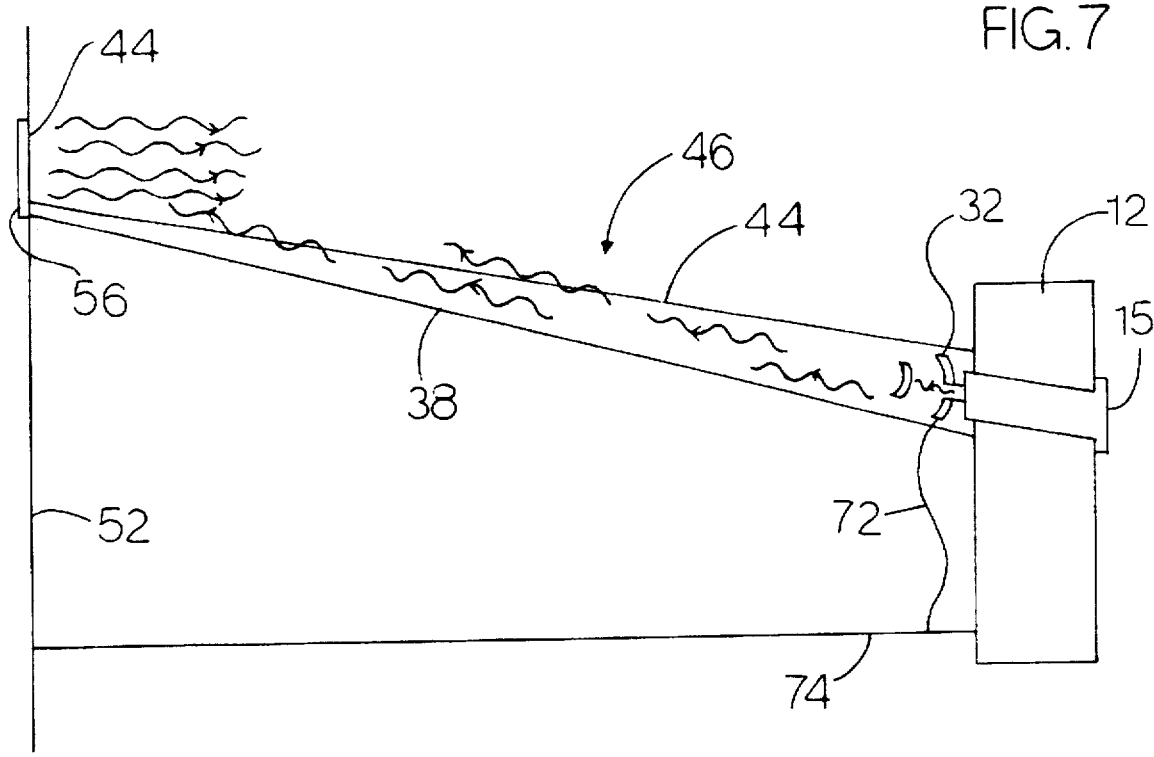
FIG. 7 is a diagram of the components of the first embodiment of the invention shown in FIG. 6 for the radiation beams directed into the atmosphere in front of the leading edge of the wing and illustrating the beam, the mirrors and antenna and the orientation and placement thereof.

All of the gyrotrons 15, 17 and 19 utilize antennas to radiate the microwave energy both directly outwardly of the aircraft 20 into the atmosphere and into and through inner structures of the aircraft 20 to locations where the energy may be radiated directly into the atmosphere. Sets of preferably cassagrain types of output antennas 32, 76 and 78 are mounted at the output of each of the gyrotrons 15, 17 and 19 to emit the radiation into and through conduits which are preferably nitrogen filled waveguides 34 (or simply nitrogen filled passageways) located within the wing 24 of the aircraft 20, as shown in FIG. 7. However, other types of microwave radiation waveguides or conductors may also be utilized if desired and as appropriate for the particular application. Preferably an inverse cassagrain type of antenna 36 is mounted at appropriate fuselage portions of the aircraft 20 for receiving the radiation transmitted through the waveguide 34 and emission of the radiation directly into the atmosphere. The waveguides 34 preferably include a first set of waveguides 38, a second set of waveguides 40 and a third set of waveguides 42. The first set of waveguides 36 are preferably mounted within the wing 24 and positioned at the output of the gyrotrons 15 (and antennas 32) in order to receive the radiation output therefrom and transmit and direct it to a first set of (preferably contoured) radomes 44 at leading edges 46 of the wing 24. The second set of waveguides 40 are preferably also mounted within the wing 24 and positioned at the output of the gyrotrons 17 (and antennas 76) in order to receive the radiation output therefrom and transmit and direct it to a second set of radomes 48 at trailing edges 50 of the wing 24. The third set of waveguides 42 are preferably mounted within the wing 24 and the fuselage 52 and positioned at the output of the gyrotrons 19 (and antennas 78) in order to receive the radiation output therefrom and transmit and direct it to a third set of radomes 54 at the front portion (or tip) 30 of the fuselage 58. The sets of radomes 44, 48 and 54 are preferably composed of sintered aluminum oxide to provide heat and oxidation resistance while also allowing the microwave radiation to pass therethrough into the atmosphere. The sets of radomes 44, 48 and 54 are also positioned at surface portions of the aircraft 20 in the path of the microwave radiation beams exiting the aircraft 20 and emitted into the atmosphere.

Figure 6:
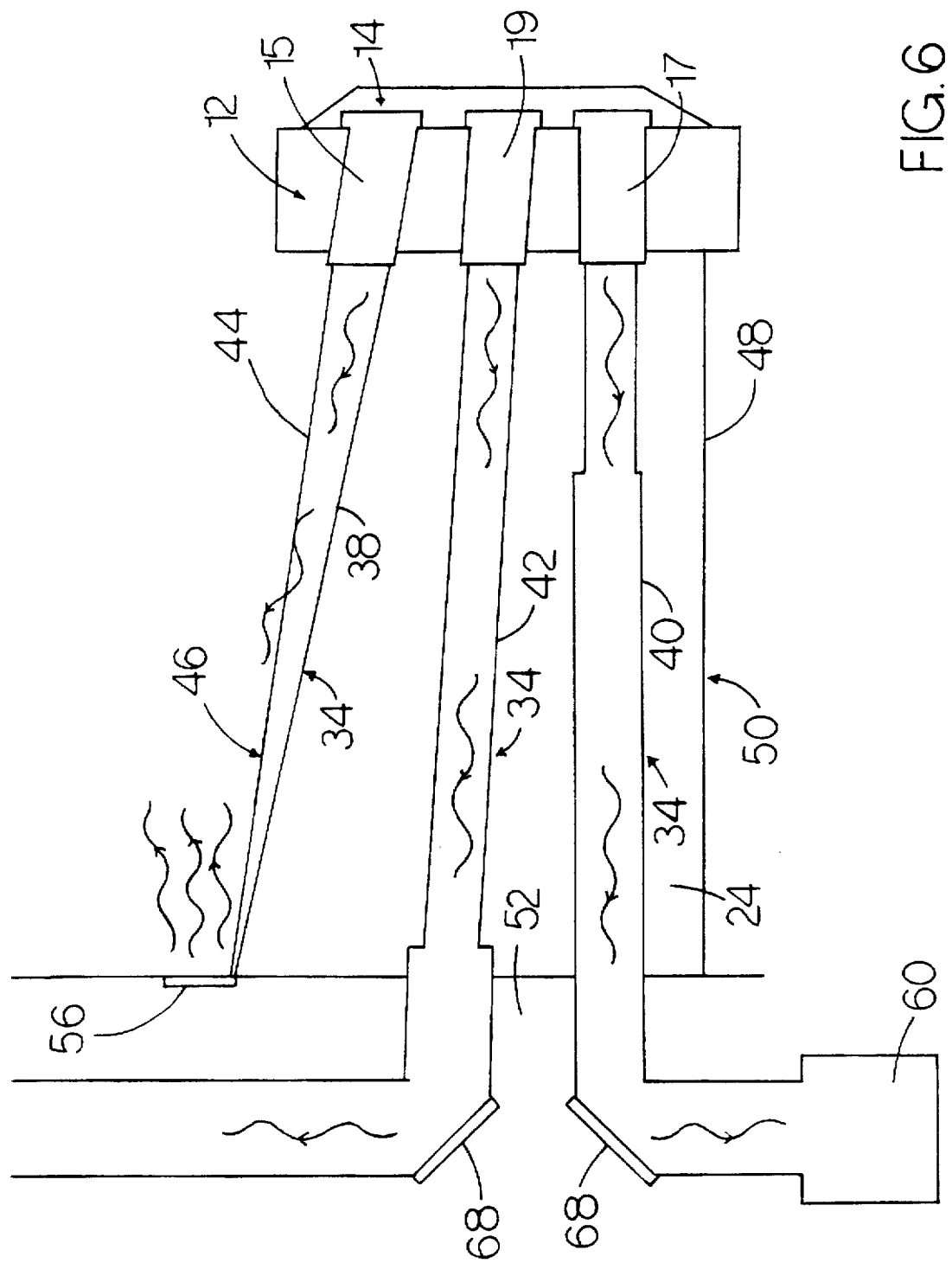
FIG. 6 is a diagram of components of a first embodiment of the invention showing microwave beams radiated through a wing and fuselage portion of the an aircraft and radiated into the atmosphere in front of the leading edge of the wing and into the rear of the trailing edge of the wing.

A first set of mirrors 56 are also included and positioned at preferably the distal end of the first set of waveguides 38 for receiving the radiation beam transmitted through the set of waveguides 38 and reflecting the beam generally backward into and through the first set of radomes 44 and outward into the atmosphere in front of the wing's 24 leading edge 46. The reflected beam is preferably angled relative to the leading edge 46 so that it is nearly parallel thereto and more preferably at an angle of approximately fifteen degrees relative thereto, as shown in FIGS. 6 and 7. Thus, the beam is oriented such that although it is projected so that it is directly in front of the entire length of leading edge 46 it is not positioned at an excessive distance from any portion of the leading edge 46 and therefore does not heat a portion of the atmosphere an excessive distance from the leading edge 46.

The output of the continuous wave gyrotron 15 is fed into the first set of cassagrain output antennas 32 which are oriented so that they emit the radiation directly into the first set of waveguides 38 as well as into and through the first set of radomes 44, as shown in FIG. 7. Thus, a portion of the beam emitted from the output antenna 32 is transmitted into the first set of waveguides 38 while another portion of the beam emitted therefrom is transmitted into the first set of radomes. The portion of the radiation beam transmitted through the first set of radomes 44 directly from the output antenna 32 is emitted into the atmosphere directly in front of the leading edge 46 and approximately parallel thereto. The beams reflected into the atmosphere in front of the leading edge 46 from the mirrors 56 and directly from the output antenna 32 are directed generally towards each other.

The output of the continuous wave gyrotron 17 is fed into another set of cassagrain output antennas 76 which radiate the microwave beam into and through the second set of waveguides 40. A second set of mirrors 58 positioned in the second set of waveguides 40 reflects and directs the beam into and through the second set of radomes 48 into the atmosphere directly rearward of the trailing edges 50. More specifically, the radiation beam is radiated through the second set of waveguides 40 onto a second set of mirrors 58, located at approximately midwing, which direct the beam rearwardly. The second set of radomes 48 at the trailing edges are wider than the first set of radomes 44 at the leading edge and consequently a larger region of aft wing heats the air leaving the wing's surface.

A portion of the microwave beam transmitted through the second set of waveguides 40 is directed onto a third set of mirrors 60 located in the fuselage 52 which reflect the beam toward a fourth set of radomes 62 located at the vertical leading edge 64 of the tail stabilizer 66. More specifically, a third set of mirrors 60 located at a bend in the waveguide (preferably in the fuselage 52) reflects the beam rearwardly through the waveguide 40 and the fuselage 52 to another of the third set of mirrors 60 located proximal the tail stabilizer 66 which reflects the beam into and through the fourth set of radomes 62 and outwardly into the atmosphere directly in front of the tail stabilizer 66 leading edge 64. The beam emitted into the atmosphere from the fourth set of radomes 62 is oriented so that it is generally parallel to the tail stabilizer's 66 leading edge 64, as is the beam emitted from the antenna 32 directly into the atmosphere in front of the leading edge 46 of the wing 24, as described above.

Figure 9:
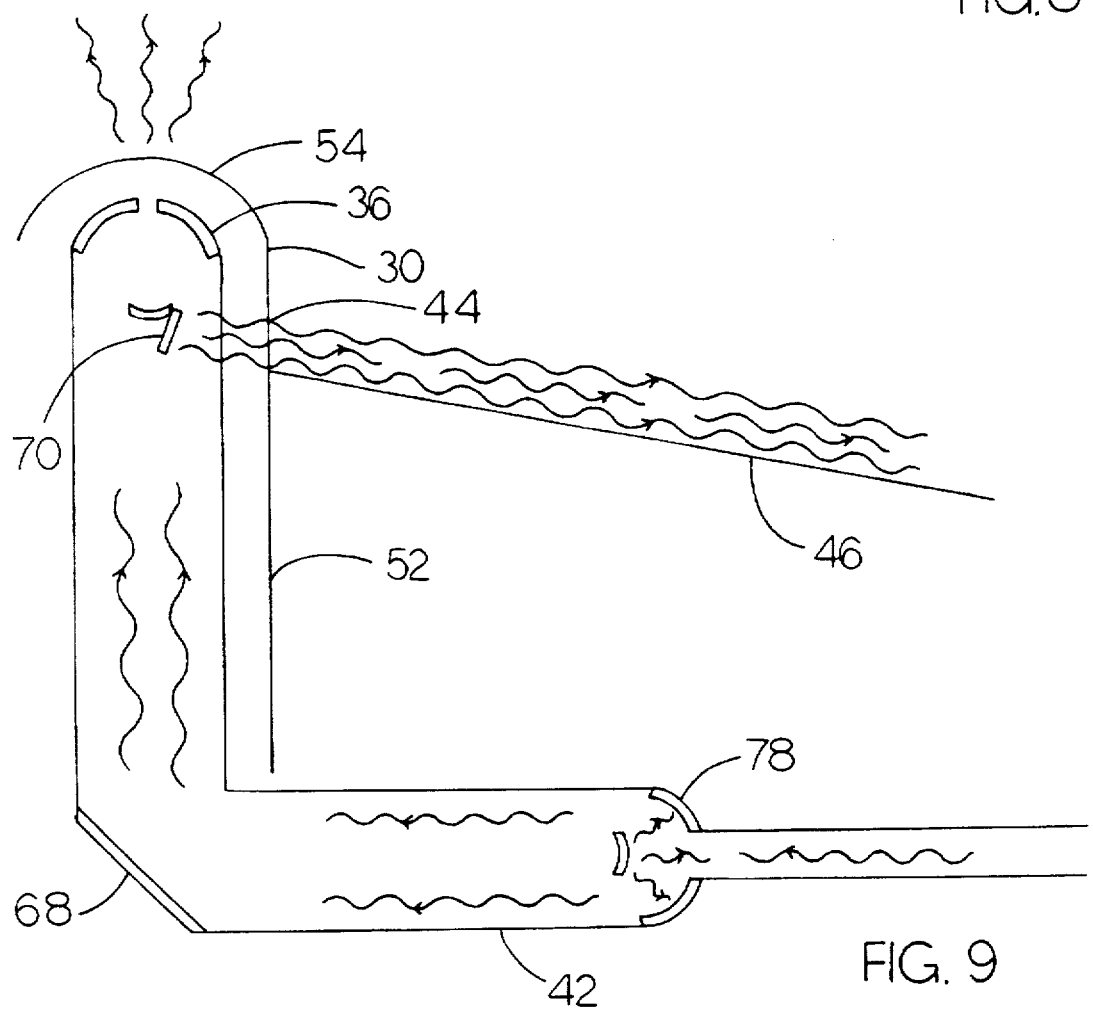
FIG. 9 is a diagram of the components of the first embodiment of the invention shown in FIGS. 6, 7 and 8 and additionally showing components utilized to radiate the microwave beam from the fuselage of the aircraft outwardly into the atmosphere both in front of the fuselage and along the leading edge of the wing.

The output of the pulse gyrotron 19 is fed to the third set of the cassagrain antennas 78 which radiate it into and through the third set of waveguides 42 and through the third set of radomes 54 into the atmosphere directly in front of the front portion 30 of the fuselage 52. As shown in FIGS. 6 and 9, a fourth set of mirrors 68 located in the fuselage and at a bend in the third set of waveguides 42 reflects the beam forwardly through the fuselage 52 into one of the inverse cassagrain antennas 36 which emits the radiation beam into and through the third set of radomes 54. As with the other of the inverse cassagrain antennas 36, this inverse cassagrain antenna 36 emits a broadened beam of radiation into the atmosphere directly in front of the front portion 30 of the fuselage 52. In addition, there is also a seventh mirror or set of mirrors 70 mounted in the fuselage 52 which receives, reflects and directs a portion of the pulsed radiation beam transmitted through the fuselage 52 into and through the first set of radomes 44 and outwardly into the atmosphere directly in front of the leading edge 46. As described above, the radiation emitted from the fuselage 52 is pulsed in order to allow both radar and continuous wave communications signals to be transmitted and received while the aerodynamic efficiency augmentation system of the present invention is in operation.

In addition, some of the remaining microwave radiation is fed directly from the output antenna 32 to the electromagnetically conducting skin 74 of the wing 24 by means of an electric conductor (or waveguide) 72, as shown in FIG. 7. The microwave radiation is thus allowed to be transmitted directly through the outer surface 74 of the wing (and other parts of the aircraft 20 such as the fuselage 52, if desired). This radiation being conducted through the outer surfaces 74 heats the air adjacent thereto resulting in reduced viscous drag for these portions of the aircraft 20.

Figure 11:
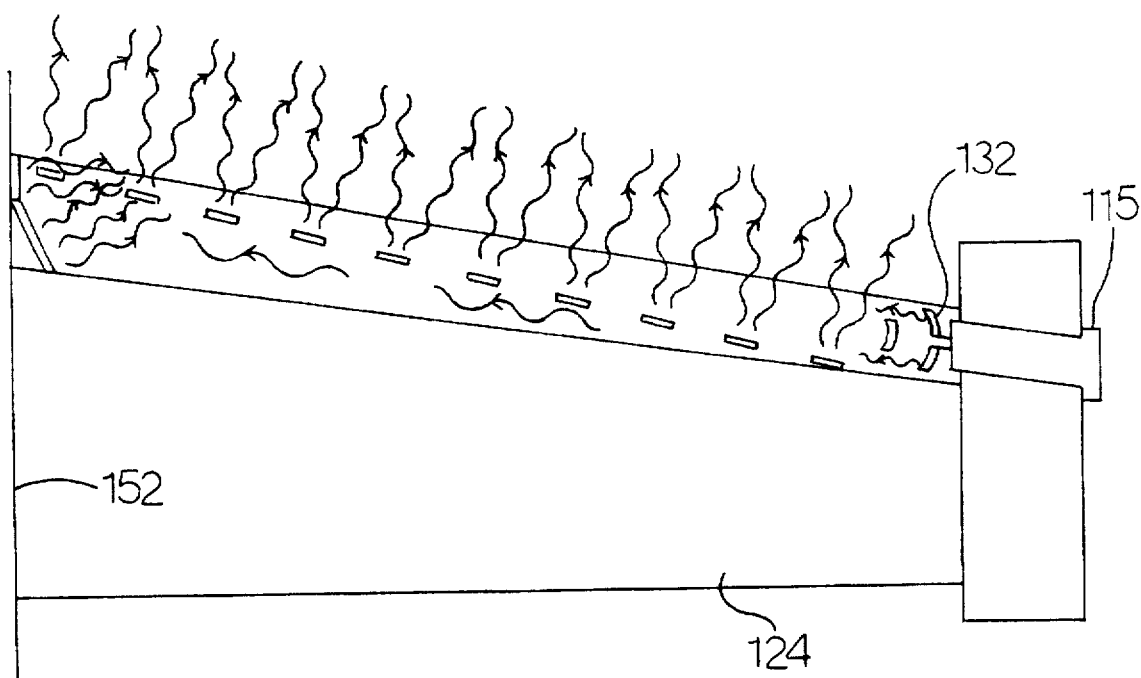
FIG. 11 is a diagram of the components of the second embodiment of the invention shown in FIG. 10 and specifically showing in more detail components utilized to radiate the microwave beam through the wing portion of the aircraft and radiated into the atmosphere in front of the leading edge of the wing.
Figure 8:
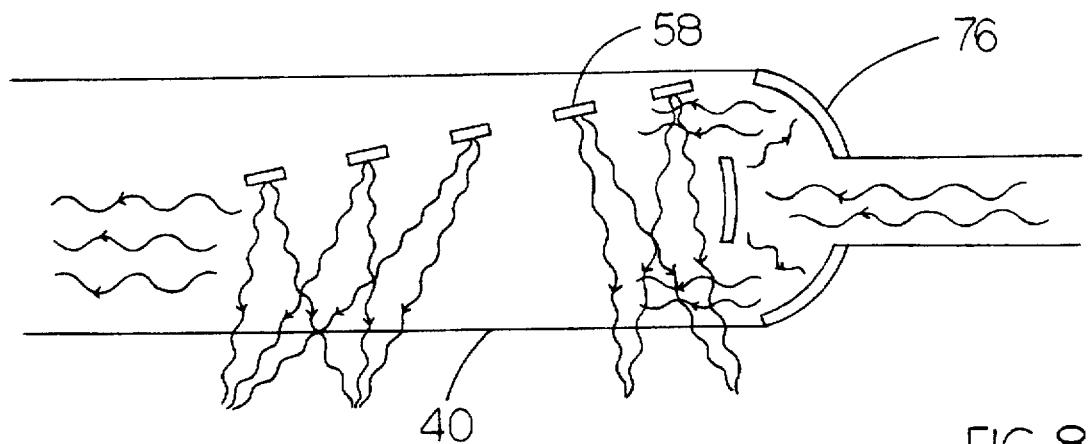
FIG. 8 is a diagram of the components of the first embodiment of the invention shown in FIG. 6 for the radiation beams directed into the atmosphere rearward of the trailing edge of the wing and illustrating the beam, the mirrors and antenna and the orientation and placement thereof.
Figure 10:
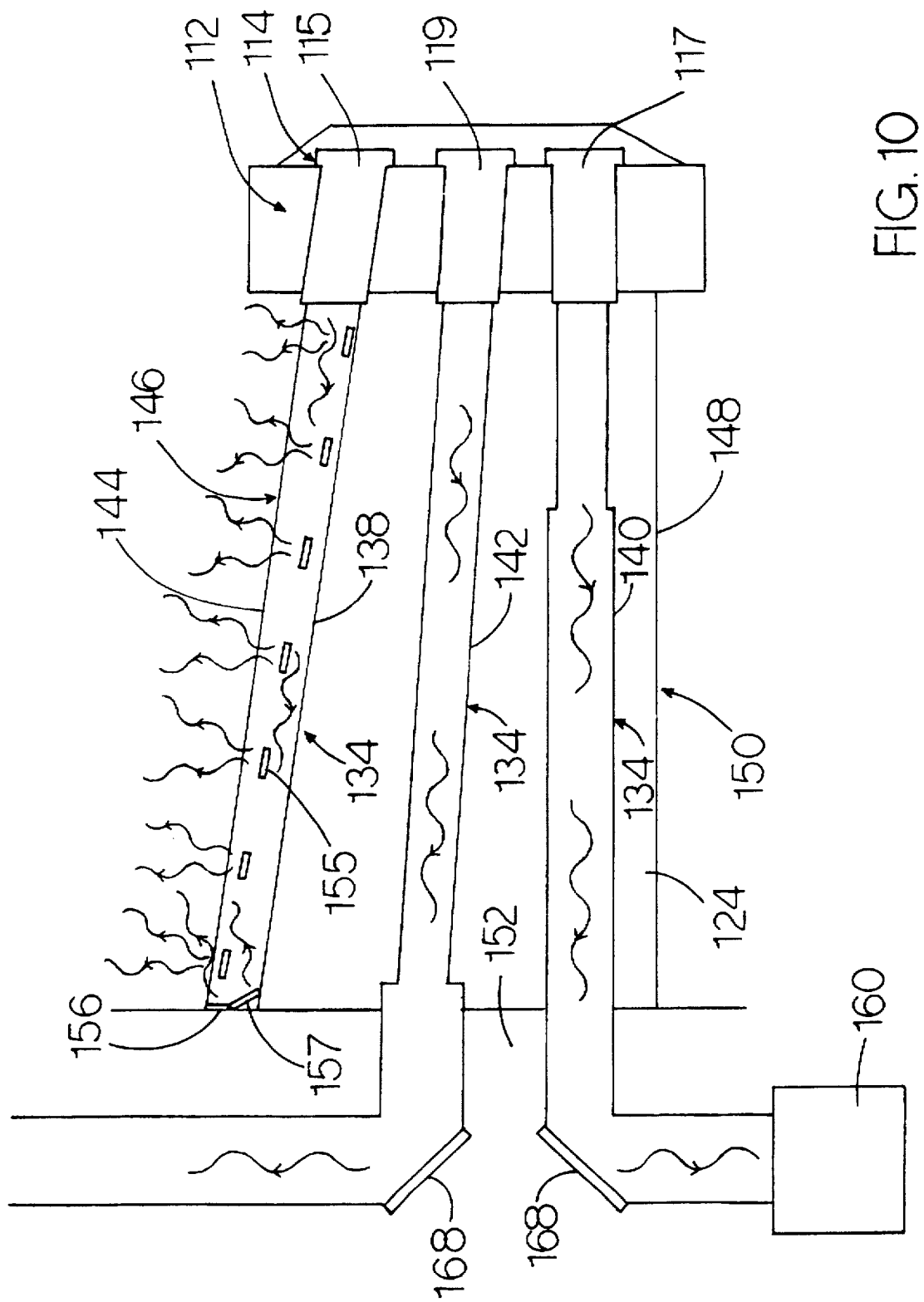
FIG. 10 is a diagram of components of a second embodiment of the invention showing microwave beams radiated through a wing portion of the aircraft and radiated outwardly into the atmosphere in front of the leading edge of the wing and into the rear of the trailing edge of the wing.

FIGS. 10, 11, 12 and 13 show the second embodiment of the invention 110 which is essentially identical to the first embodiment 10 except that the microwave beams are radiated outwardly in front of the leading edges 146 in a direction generally parallel to the direction of motion of the aircraft 120 rather than at a small angle (or nearly parallel) to the leading edge 46 i.e., approximately perpendicular to the direction of motion, as in the design of embodiment 10. The rays of the radiation beam emitted from the leading edges 146 are also divergent from each other, as shown in FIG. 11. In the embodiment 110, a fifth set of mirrors 155 is provided which receive the radiation beam emitted from the first set of cassagrain output antennas 132. The fifth set of mirrors 155 are located in the first set of waveguides 138 at locations along the length thereof behind the leading edges 146 of the wings 124, as shown in FIG. 10. The fifth set of mirrors 155 are oriented so that they reflect and direct the radiation beam into and through a first set of radomes 144 mounted at the surface portions of the leading edges 146 and into the atmosphere directly in front of the leading edges 146. The remainder of the radiation beam transmitted through the first set of waveguides 138 which is not emitted through the first set of radomes 144 via reflection from the fifth set of mirrors 155 is reflected off a first and sixth set of mirrors 156 and 157 located at the inner end portion of the first set of waveguides 138 at or proximal to the fuselage 152 and directed to the first set of radomes 144 at the leading edge 146 of the wing for emission into the atmosphere in front of the leading edge 146. The radiation beam emitted from the first set of mirrors 156 through the first set of radomes 144 is oriented such that it is preferably angled relative to the leading edge 146 so that it is nearly parallel thereto and more preferably at an angle of approximately fifteen degrees relative thereto, as shown in FIG. 10 and similar to the angle produced by the first set of mirrors 56 of embodiment 10. The sixth set of mirrors 157 is oriented so that it is more nearly perpendicular to the direction of transmission of the radiation beam through the first set of waveguides 138 and thus reflects and directs the radiation beam through the first set of radomes 144 in a direction laterally outward from the aircraft 120 and in front of the leading edge 146. The sixth set of mirrors 157 is oriented so that the angle of the radiation beam reflected therefrom is more obtuse than that of the beam reflected from the first set of mirrors 156 and this angle is preferably approximately 30 degrees. Thus, each of the beams is oriented such that although it is projected so that it is directly in front of the entire length of leading edge 146 it is not positioned at an excessive distance from any portion of the leading edge 146 and therefore does not heat a portion of the atmosphere an excessive distance from the leading edge 146.

Figure 12:
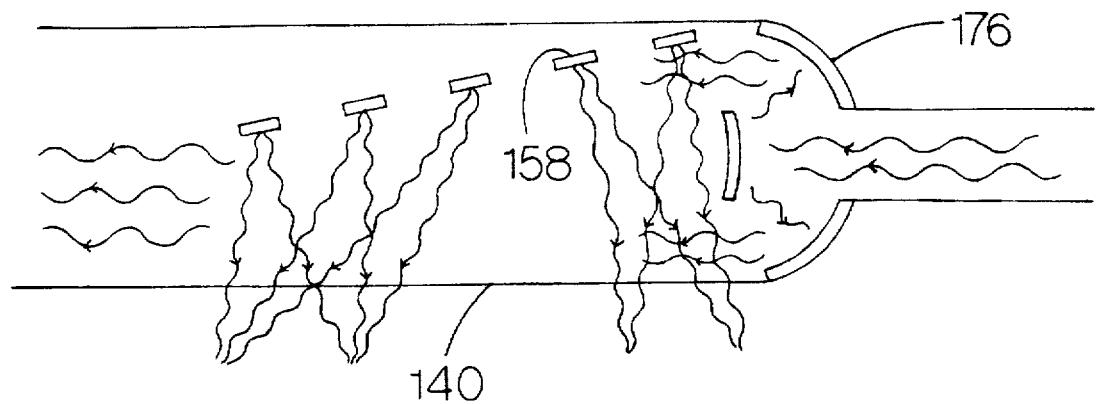
FIG. 12 is a diagram of the components of the second embodiment of the invention shown in FIG. 10 and specifically showing in more detail components utilized to radiate the microwave beam through a wing portion of the aircraft and radiated into the atmosphere rearward of the trailing edge of the wing.

As shown in detail in FIG. 12, the output of the continuous wave gyrotron 117 is fed into a second set of cassagrain output antennas 176 which radiate the microwave beam into and through the second set of waveguides 140. A second set of mirrors 158 positioned in the second set of waveguides 140 reflects and directs the beam into and through the second set of radomes 148 into the atmosphere directly rearward of the trailing edges 150. The emission of the radiation beam from the trailing edges 150 is accomplished using structures which are identical to and function the same as correspondingly numbered components described above with respect to embodiment 10. The radiation beam is radiated through the second set of waveguides 140 onto a second set of mirrors 158, located at approximately midwing, which direct the beam rearwardly into an inverse cassagrain antenna 136 which emits the radiation beam into and through the second set of radomes 148 outwardly and rearwardly into the atmosphere rearward of the trailing edges 150. As with the corresponding structures of embodiment 10, the second set of radomes 148 at the trailing edges 150 are wider than the first set of radomes 144 at the leading edge and consequently a larger region of aft wing heats the air leaving the wing's surface.

A portion of the microwave beam transmitted through the second set of waveguides 140 is directed onto a third set of mirrors 160 located in the fuselage 152 which reflect the beam toward a fourth set of radomes 162 located at the vertical leading edge 164 of the tail stabilizer 166. As with the correspondingly numbered components of embodiment 10, the third set of mirrors 160 reflects the beam rearwardly through the waveguide 140 and the fuselage 152 to another of the third set of mirrors 160 located proximal the tail stabilizer 166 which reflects the beam into and through the fourth set of radomes 162 and outwardly into the atmosphere directly in front of the tail stabilizer 166 leading edge 164 and generally parallel to the leading edge 164.

Figure 13:
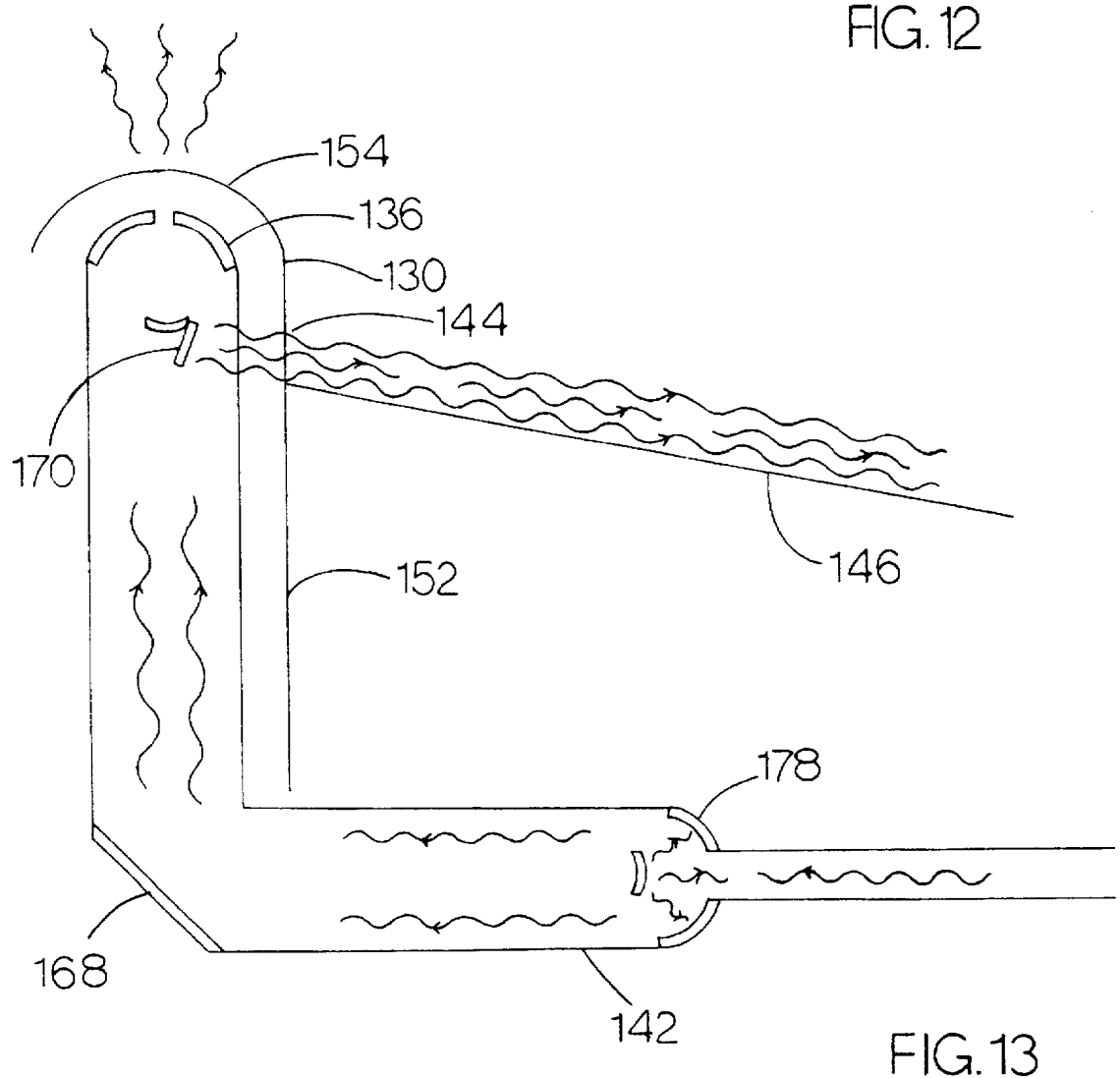
FIG. 13 is a diagram of the components of the second embodiment of the invention shown in FIGS. 10, 11 and 12 and specifically showing in more detail components utilized to radiate the microwave beam from the fuselage of the aircraft outwardly into the atmosphere both in front of the fuselage and along the leading edge of the wing.

The output of the pulse gyrotron 119 is fed to a third set of the cassagrain antennas 178 which radiate it into and through the third set of waveguides 142 and through the third set of radomes 154 into the atmosphere directly in front of the front portion 130 of the fuselage 152. The components utilized to accomplish this emission of radiation from the front portion 130 of the fuselage are structurally and functionally identical to the correspondingly numbered components of embodiment 10. As shown in FIGS. 5 and 13, a fourth set of mirrors 168 located in the fuselage and at a bend in the third set of waveguides 142 reflects the beam forwardly through the fuselage 152 into one of the inverse cassagrain antennas 136 which emits a preferably pulsed broadened beam of radiation into and through the third set of radomes 154. There is also a seventh mirror or set of mirrors 170 mounted in the fuselage 152 which receives, reflects and directs a portion of the pulsed radiation beam transmitted through the fuselage 152 into and through the first set of radomes 144 and outwardly into the atmosphere directly in front of the wing's 124 leading edge 146.

The cassagrain antennas 32, 132, 76, 176, 78 and 178 include a cassagrain primary aperture which is approximately thirteen centimeters in diameter in order to provide a radiation beam the rays of which are divergent at an angle of approximately 2.5 degrees. This beam is transmitted through the appropriate sets of waveguides 38, 40 and 42 where it gradually expands as it passes therethrough. The inverse cassagrain antennas 36 and 136 include a cassagrain primary aperture which collects the radiation transmitted through the appropriate waveguide and reflects it through a smaller aperture. This effectively broadens the beam so that the rays thereof diverge from each other at an angle of approximately nineteen degrees in order to heat a region of air two meters wide six meters in front of the aircraft. As set forth in the calculations, the primary aperture is approximately in excess of thirteen centimeters in diameter while the secondary aperture is approximately 1.7 centimeters in diameter. However, the particular sizing of these components depends on the physical design of the aircraft, its flight envelope, etc. and will thus vary in accordance with the particular application.

Accordingly, there has been provided, in accordance with the invention, a system for increasing the aerodynamic efficiency of a vehicle in motion that fully satisfies the objectives set forth above. Although the invention has been described in regard to increasing the aerodynamic efficiency of an aircraft in flight, the system of the invention may also be applied to other types of vehicles or bodies in motion through other types of fluid media. It is to be understood that all terms used herein are descriptive rather than limiting. Although the invention has been described in conjunction with the specific embodiments set forth above, many alternative embodiments, modifications and variations will be apparent to those skilled in the art in light of the disclosure set forth herein. Accordingly, it is intended to include all such alternatives, embodiments, modifications and variations that fall within the spirit and scope of the invention set forth in the claims hereinbelow.

What is claimed is:

1. A system for increasing the dynamic efficiency of a vehicle in a fluid medium, comprising:

a source of electromagnetic radiation;

means for transmitting electromagnetic radiation from said source to desired surface portions of the vehicle, said surface portions including leading edges, said means for transmitting receiving the radiation from said source;

means for emitting a beam of the radiation outwardly and away from the desired surface portions, the leading edges and the vehicle in order to heat the fluid medium thereby reducing mass density of the fluid medium to reduce dynamic drag on the vehicle, said means for emitting receiving the radiation from said means for transmitting, said desired surface portions adjacent to areas of the fluid medium heated by the radiation.

2. The system of claim 1 wherein frequency of the radiation is approximately a harmonic resonance frequency of electromagnetic excitation of molecules of the fluid to maximize heating thereof, the molecules of the fluid having electric and magnetic dipole characteristics so that the molecules are excitable by the electromagnetic radiation at the harmonic resonance frequency.

3. The system of claim 1 wherein said means for transmitting includes a set of waveguides interconnecting said source and the desired surface portions.

4. The system of claim 3 wherein said means for emitting includes an inverse cassagrain antenna having an aperture for receiving radiation transmitted through said set of waveguides and emitting the radiation through the surface portions and into the fluid medium the radiation at a microwave frequency.

5. The system of claim 3 wherein said means for transmitting includes an output cassagranian antenna for directing a first portion of the radiation from said source into said waveguide and a second portion of the radiation from said source into a portion of the fluid medium proximal to the vehicle.

6. The system of claim 5 wherein said antenna is connected to an outer surface of the vehicle for transmission of the radiation through the outer surface in order to heat an area of the fluid medium adjacent thereto.

7. The system of claim 1 wherein said means for transmitting includes a mirror for deflecting and directing the beam to the desired surface portions with minimal scattering thereof.

8. The system of claim 1 wherein said means for transmitting, said means for emitting and said source are mounted within the vehicle.

9. The system of claim 1 wherein said source has sufficient power to provide the radiation at an energy density sufficient to heat the fluid medium to a temperature of approximately 1800 degrees Centigrade.

10. A system for increasing the dynamic efficiency of a vehicle moving in a fluid medium, comprising:

a source of millimeter wavelength electromagnetic radiation at a selected frequency higher than fifty Gigahertz;

means for transmitting millimeter wavelength electromagnetic radiation at the selected frequency from said source to desired surface portions of the vehicle, said means for transmitting receiving the radiation from said source;

means for emitting a beam of the radiation outwardly and away from the desired surface portions in order to heat the fluid medium thereby reducing mass density of the fluid medium to reduce dynamic drag on the vehicle, said means for emitting receiving the radiation from said means for transmitting, the fluid medium including molecules having electric and magnetic dipole characteristics excitable by the millimeter wavelength electromagnetic radiation which is tuned to a frequency of harmonic resonance electromagnetic excitation of the molecules.

11. The system of claim 10 wherein said means for transmitting includes a waveguide interconnecting said source and at least one of the desired surface portions.

12. The system of claim 10 wherein said means for emitting includes an inverse cassagrain antenna for receiving radiation transmitted through said portions and into the fluid medium, said cassagrain antenna including a primary reflector having an aperture and a secondary reflector small relative to the primary reflector, said primary and secondary reflectors positioned so that the radiation is radiated through the aperture and reflected off the secondary reflector back into said primary reflector where it is reradiated into the fluid medium in a narrow beam the rays of which are divergent at an angle of approximately nineteen degrees.

13. The system of claim 10 wherein said means for transmitting includes a waveguide for propagating the radiation and a mirror mounted in said waveguide for deflecting and directing the beam to at least one of the desired surface portions without scattering thereof.

14. The system of claim 10 wherein said means for transmitting, said means for emitting and said source are mounted within the vehicle.

15. The system of claim 10 wherein said source has sufficient power to provide the radiation at a power density sufficient to continually heat the fluid to a temperature of approximately 1800 degrees Centigrade.

16. A system for increasing the dynamic efficiency of a vehicle moving in a fluid medium, comprising:

a source of electromagnetic radiation;

means for transmitting electromagnetic radiation from said source to desired surface portions of the vehicle, said means for transmitting receiving the radiation from said source;

means for emitting a beam of the radiation outwardly and away from the desired surface portions and away from the vehicle into the fluid medium so that the fluid medium absorbs substantially all the electromagnetic radiation energy thereof in order to heat the fluid medium thereby reducing mass density of the fluid medium to reduce dynamic drag on the vehicle, said means for emitting receiving the radiation from said means for transmitting, said surface portions adjacent to areas of the fluid medium heated by the radiation.

17. A system for increasing the dynamic efficiency of a vehicle moving in a fluid medium, comprising:

a source of electromagnetic radiation at a frequency of approximately sixty Gigahertz;

means for transmitting electromagnetic radiation at the frequency of sixty Gigahertz from said source to desired surface portions of the vehicle, said means for transmitting receiving the radiation from said source;

means for emitting a beam of the radiation outwardly from the desired surface portions into the fluid medium in order to heat the fluid medium thereby reducing mass density of the fluid medium to reduce dynamic drag on the vehicle, said means for emitting receiving the radiation from said means for transmitting.

18. A system for increasing the dynamic efficiency of a vehicle moving in a fluid medium, comprising:

a source of electromagnetic radiation, said source of electromagnetic radiation including a pulsed gyrotron to allow radar to be used on the vehicle and a continuous wave gyrotron, said pulsed and continuous wave gyrotrons located at an engine of the vehicle and positioned in a path of engine induction flow for heat exchange between engine induction and exhaust flow and said gyrotron in order to enhance energy efficiency thereof;

means for transmitting electromagnetic radiation from said source to desired surface portions of the vehicle, said means for transmitting receiving the radiation from said source;

means for emitting a beam of the radiation outwardly and away from the desired surface portions into the fluid medium in order to heat the fluid medium thereby reducing mass density of the fluid medium to reduce dynamic drag on the vehicle, said means for emitting receiving the radiation directly from said means for transmitting or directly from said source of electromagnetic radiation.

19. A system for increasing the dynamic efficiency of a vehicle moving in a air medium, comprising:

a source of electromagnetic radiation;

means for transmitting electromagnetic radiation from said source to desired surface portions of the vehicle, said means for transmitting receiving the radiation from said source;

means for emitting a beam of the radiation outwardly and away from the desired surface portions into the fluid medium in order to heat the air medium thereby reducing mass density of the air medium to reduce dynamic drag on the vehicle, said means for emitting receiving the radiation from said means for transmitting, the air medium including molecules having electric and magnetic dipole characteristics excitable by the electromagnetic radiation which is tuned to a frequency of harmonic resonance electromagnetic excitation of the molecules.

* * * * *